US010599019B2

(12) United States Patent
Kim et al.

(10) Patent No.: US 10,599,019 B2
(45) Date of Patent: Mar. 24, 2020

(54) ELECTRONIC DEVICE HAVING HEAT DISSIPATION STRUCTURE OF CAMERA

(71) Applicant: SAMSUNG ELECTRONICS CO., LTD., Suwon-si, Gyeonggi-do (KR)

(72) Inventors: Seongeun Kim, Hwaseong-si (KR); Jung-Sik Park, Suwon-si (KR); Seung-Ki Choi, Suwon-si (KR); Soo-Jung Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/921,967

(22) Filed: Mar. 15, 2018

(65) Prior Publication Data

US 2018/0267390 A1    Sep. 20, 2018

(30) Foreign Application Priority Data

Mar. 15, 2017    (KR) .................. 10-2017-0032287

(51) Int. Cl.
*G03B 17/55*    (2006.01)
*H04M 1/02*    (2006.01)
*H04N 5/225*    (2006.01)

(52) U.S. Cl.
CPC .......... *G03B 17/55* (2013.01); *H04M 1/0264* (2013.01); *H04N 5/2252* (2013.01); *H04N 5/2256* (2013.01); *H04N 5/2257* (2013.01); *H04N 5/22521* (2018.08)

(58) Field of Classification Search
CPC .. G03B 17/55; H04N 5/2256; H04N 5/22521; H04N 5/2257; H04N 5/2252; H04M 1/0264
See application file for complete search history.

(56) References Cited

U.S. PATENT DOCUMENTS

| 2015/0326056 | A1* | 11/2015 | Koyanagi | ............... H02J 7/025 320/108 |
| 2015/0350500 | A1* | 12/2015 | Gutierrez | ............. H04N 5/2253 348/374 |
| 2016/0273968 | A1 | 9/2016 | Novotny | |
| 2016/0313773 | A1* | 10/2016 | Kim | ....................... H04B 1/036 |
| 2017/0068292 | A1* | 3/2017 | Hooton | ................... G06F 1/203 |
| 2018/0183913 | A1* | 6/2018 | Kwak | ................. H04M 1/0268 |

\* cited by examiner

*Primary Examiner* — Nhan T Tran
(74) *Attorney, Agent, or Firm* — Nixon & Vanderhye P.C.

(57) ABSTRACT

An electronic device according to various embodiments of the present disclosure can include at least one heat component, a camera module comprising a camera disposed near the at least one heat component, and a support comprising a first opening in which the camera module is inserted and disposed with a gap along at least a portion of a periphery of the camera module.

17 Claims, 16 Drawing Sheets

ELECTRONIC DEVICE HAVING HEAT DISSIPATION STRUCTURE OF CAMERA

CROSS-REFERENCE TO RELATED APPLICATION

This application is based on and claims priority under 35 U.S.C. § 119 to Korean Patent Application No. 10-2017-0032287, filed on Mar. 15, 2017, in the Korean Intellectual Property Office, the disclosure of which is incorporated by reference herein in its entirety.

TECHNICAL FIELD

The present disclosure relates to an electronic device including a heat dissipation structure of a camera module.

BACKGROUND

As a user carries a mobile phone, a tablet Personal Computer (PC), or a notebook computer, an electronic device providing various contents is widely used. Such an electronic device includes various additional devices so that the user can experience various contents. Representative additional devices include a camera module which captures an object on a picture or a video.

In recent, a dual-camera module is developed as a kind of the camera module, to make a high-resolution picture or a video of objects not only in a short range but also in a long range by use of two cameras. Since the dual-camera module uses the two cameras, it can produce a higher heat than an existing single-camera module. Accordingly, performance of the camera module can be degraded by the heat unless the dual-camera module is disposed with an adequate heat dissipation structure in the electronic device.

A typical heat dissipation path in a portable electronic device is a support member for a heat source with the widest heat dissipation area. The portable electronic device includes an Application Processor (AP) or a Power Management Integrated Circuit (PMIC) as main heat dissipation components, and the heat from the AP or the PMIC needs to be quickly emitted to the support member to lower the heat. When the camera module is disposed in the support member on a path which spreads the heat from the AP or the PMIC, the spreading heat can be transferred to the camera module and can degrade the performance of the camera module.

SUMMARY

In accordance with an example aspect of the present disclosure, an electronic device according to an embodiment of the present disclosure can include at least one heat component, a camera module disposed near the at least one heat component, and a support member comprising a first opening to which the camera module is inserted and disposed with a gap along a periphery of the camera module.

In accordance with another example aspect of the present disclosure, an electronic device according to another embodiment of the present disclosure can include a housing comprising a first surface which faces a first direction, a window comprising a second surface which faces a second direction opposite the first direction, a support member interposed between the housing and the window, a display interposed between the support member and the window, and a printed circuit board interposed between the housing and the support member. The first surface of the housing comprises a camera hole, the printed circuit board comprises a first opening in a region corresponding to the camera hole, and the support member comprises a second opening in a region corresponding to the camera hole and the first opening. A camera module is exposed to an outside of the electronic device through the camera hole of the first surface, securely coupled to and supported by the first opening of the printed circuit board, inserted in the second opening of the support member, and spaced from the second opening of the support member with a gap along at least a portion of the periphery thereof.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

Throughout the drawings, like reference numerals will be understood to refer to like parts, components and structures.

DETAILED DESCRIPTION

Figure 1A:
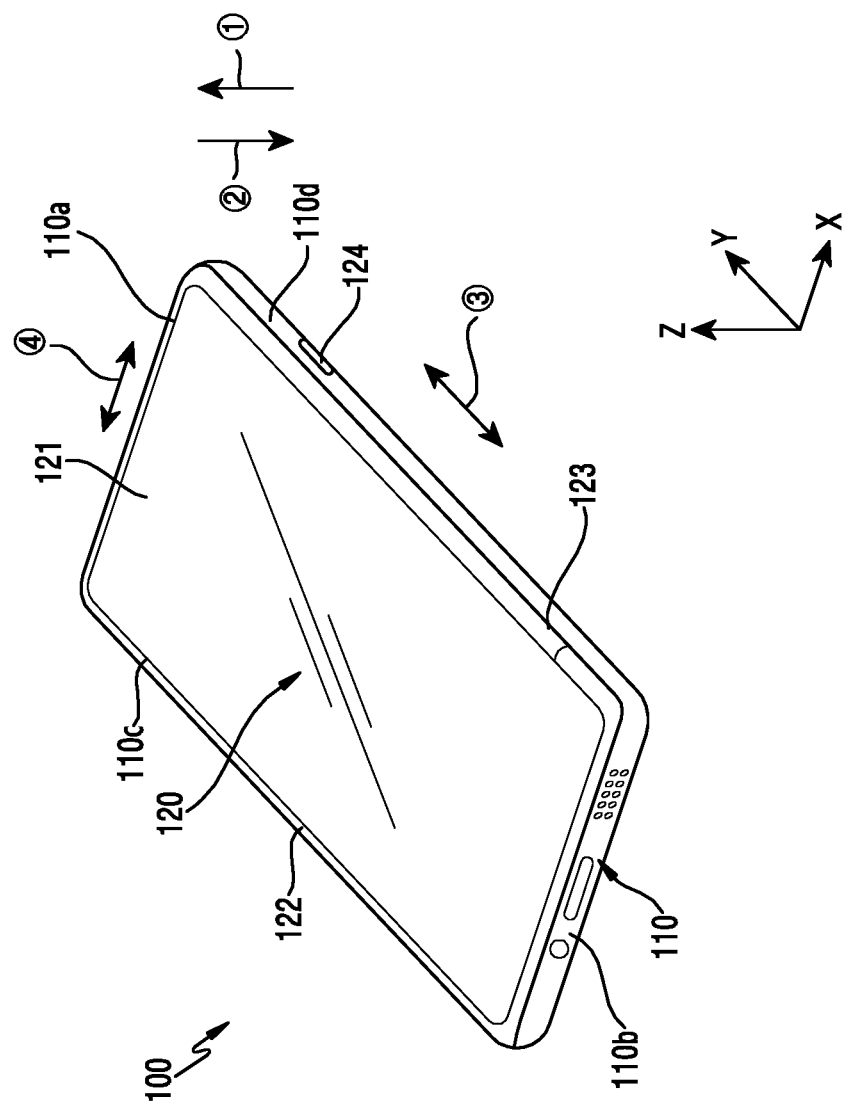
FIG. 1A is a perspective view of a front of an electronic device according to various embodiments of the present disclosure.

Hereinafter, various example embodiments of the present disclosure will be described with reference to the accompanying drawings. However, it should be understood that the present disclosure is not limited to the particular forms disclosed herein. Rather, the present disclosure should be understood to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B.

The expressions "a first", "a second", "the first", or "the second" as used in various embodiments of the present disclosure may be used to denote various components regardless of the order and/or the importance but do not limit the corresponding components. Such terms can be used for distinguishing one element from another element. For example, a first user device and a second user device indicate different user devices although both of them are user devices. For example, a first element may be referred to as a second element, and similarly, a second element may be referred to as a first element, without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. On the other hand, when an element (e.g., first element) is referred to as being "directly connected," or "directly coupled" to another element (second element), there are no elements (e.g., third element) interposed between them.

The expression "configured (or set) to" as used in the present disclosure may be used interchangeably with, for example, "suitable for", "having the capacity to", "designed to", "adapted to", "made to", or "capable of" according to the situation. The term "configured (or set) to" may not necessarily imply "specifically designed to" in hardware. Alternatively, in some situations, the expression "device configured to" may refer to a situation in which the device, together with other devices or components, "is able to". The phrase "processor adapted (or configured) to perform A, B, and C" may refer, for example, and without limitation, to a dedicated processor (e.g. embedded processor) only for performing the corresponding operations or a general-purpose processor (e.g., central processing unit (CPU) or application processor (AP)) that may perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the meanings equal to the contextual meanings in the relevant field of art, and are not to be interpreted to have ideal or excessively formal meanings unless clearly defined in the present disclosure. In some cases, even where a term is defined in the present disclosure, it should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device (e.g., smart glasses, a Head-Mounted-Device (HMD), an electronic textiles, an electronic bracelet, an electronic necklace, an appcessory, electronic tattoo, a smart mirror, or a smart watch), or the like, but is not limited thereto.

According to an embodiment, the electronic device may be a smart home appliance. The smart home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a vehicle infotainment device, an electronic device for a ship (e.g., a navigation device for a ship, and a gyro-compass), avionics, security devices, an automotive head unit, a robot for home or industry, an Automatic Teller Machine (ATM), a Point Of Sales (POS) terminal, or an Internet of Things (IoT) device (e.g., a light bulb, various sensors, electric or gas meter, a sprinkler device, a fire alarm, a thermostat, a streetlamp, a toaster, a sporting good, a hot water tank, a heater, a boiler, etc.), or the like, but is not limited thereto.

According to an embodiment, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. In various embodiments, the electronic device may be a combination of one or more of the aforementioned various devices. According to an embodiment, the electronic device may be a flexible device. Further, the electronic device is not limited to the aforementioned devices, and may include a new electronic device according to the development of new technology.

In the following, various embodiments are explained in greater detail by referring to the attached drawings. Notably, components in the drawings may be exaggerated or reduced in size to facilitate the understanding. For example, a size and a thickness of each component in the drawings are arbitrary to ease the understanding, and the preset disclosure is not limited to them.

An orthogonal coordinate system is used, where an x axis can indicate a horizontal direction of the electronic device, a y axis can indicate a vertical direction of the electronic device, and a z axis can indicate a thickness direction of the electronic device. Notably, the x axis, the y axis, and the z axis are not limited to those three axes on the orthogonal coordinate system and can be interpreted in a broad sense including the same. For example, the x axis, the y axis, and the z axis may be orthogonal to one another, but may also refer to different directions which are not perpendicular to each other.

Figure 1B:
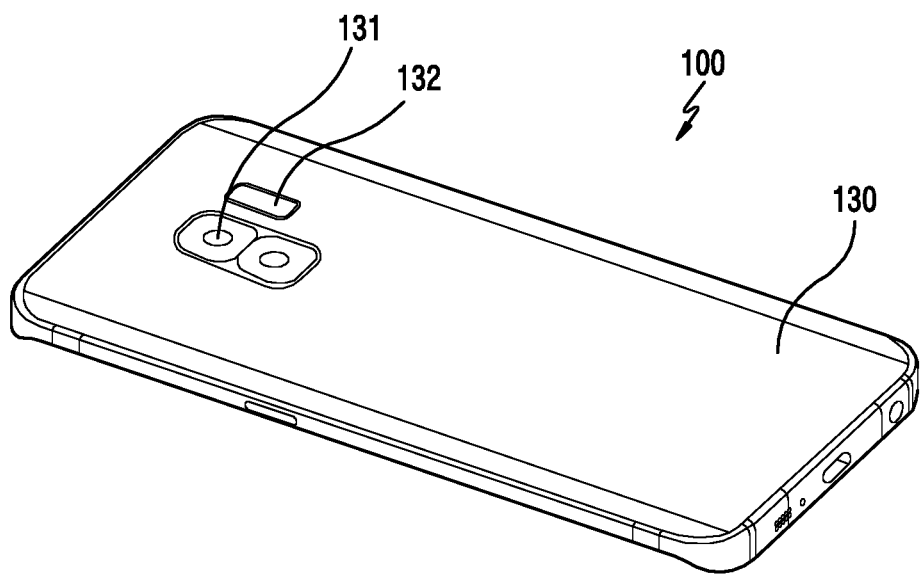
FIG. 1B is a perspective view of a rear of an electronic device according to various embodiments of the present disclosure.

FIG. 1A is a perspective view of a front of an electronic device according to various embodiments of the present disclosure, and FIG. 1B is a perspective view of a rear of an electronic device according to various embodiments of the present disclosure.

Referring to FIG. 1A and FIG. 1B, an electronic device 100 according to various embodiments forms an exterior and can include a housing 110 for protecting electronic components. The housing 110 can include a first surface 121 facing a first direction ① or +z, a second surface 130 facing a second direction ② or −z which is opposite to the first direction ①, and a side surface facing a direction perpendicular to the first and second directions ① and ② and surrounding at least part of a space between the first surface 121 and the second surface 130. A lateral direction can include a third direction ③ or ±y and/or a fourth direction ④ or ±x. For example, when the first direction ① is upward, the first surface 121 can be the front of the electronic device 100. When the second direction ② is downward, the second surface 130 can be the rear of the electronic device 100.

The housing 110 according to various embodiments can include a plurality of side surfaces. For example, based on the first surface 121 at the top, the housing 110 can include an upper side surface 110a, a lower side surface 110b, a left side surface 110c, and a right side surface 110d. The upper side surface 110a, the lower side surface 110b, the left side surface 110c, and the right side surface 110d can be combined to form edges or a periphery of the electronic device 100. The present disclosure is not limited to this embodiment, and the electronic device 100 can include side surfaces in various numbers and various shapes according to the shape of the front surface 121 or the rear surface 130.

According to an embodiment of the present disclosure, the electronic device 100 can include a display 120. The display 120 according to various embodiments can use a full display screen to occupy most of the front surface of the electronic device 100. The display 120 can include a flat display and a curved display which is disposed in at least part of edges of the flat display. For example, the flat display 120 can include first and second curved displays 122 and 123 at left and right edges respectively.

According to an embodiment of the present disclosure, the electronic device 100 can control a display module to selectively display contents on the display 120. For example, the electronic device 100 can display a screen only on the flat display 120 by controlling the display module. The electronic device 100 can control the display module to display the screen by including any one of the first and second curved displays 122 and 123 together with the flat display 120. The electronic device 100 may control the display control the display module to display the screen merely using at least one of the first and second curved displays 122 and 123, excluding the flat display 120. According to various embodiments, the upper and lower edges 110a and 110b not including the first and second curved display 122 and 123 can include a portion of the housing 110 of a metallic material. For example, the portion of the housing 110 of the metallic material, which is an external metal frame, can be distinguished as an insulator and operate as an antenna radiator. While the first and second curved displays 122 and 123 are disposed on, but not limited to, the left and right edges of the flat display 120 in this embodiment, the curved display can be disposed in various regions.

According to an embodiment of the present disclosure, the housing 110 can include components for performing various functions of the electronic device 100. The components can include at least one sensor module. The sensor module can include at least one of, for example, an illumination sensor, a proximity sensor, an infrared sensor, and an ultrasonic sensor. Alternatively, the components can include a front facing camera. Such electronic components can be adequately disposed at arbitrary positions of the housing 110.

Various electronic components can be disposed in the lower side surface 110b of the housing 110. For example, a microphone, a speaker, an interface connector, and an ear-jack hole can be disposed on a lower external metal frame. Also, a socket device for inserting a card-type external device can be disposed in the upper side surface 110a of the housing 110. The socket device can receive at least one of a unique ID card (e.g., a Subscriber Identity Module (SIM) card, a User Identity Module (UIM) card, etc.) for the electronic device 100, and a memory card for expanding storage space. At least one first side key button 124 can be disposed in the right side surface 110d. The side key button 124 can execute power on/off functions, wakeup/sleep functions of the electronic device 100, and so on.

Referring to FIG. 1B, a rear facing camera 131 can disposed in the rear surface 130 of the electronic device 100 according to an embodiment of the present disclosure, and at least one electronic component 132 can be disposed on a periphery of the rear facing camera 131. For example, the electronic component 132 can include, for example, and without limitation, at least one of an illumination sensor, a proximity sensor, an infrared sensor, an ultrasonic sensor, a heart rate monitor sensor, and a flash device, or the like. The rear facing camera 131 can include dual cameras. For example, the dual cameras can include two lenses disposed on a single big image sensor, or include two separate image sensors and two lenses disposed on the image sensors respectively. The two lenses can include a combination of a tele lens and/or a wide lens. The image sensor can include, but not limited to, a combination of at least two of an image sensor including a color filter (e.g., Bayer filter), an image sensor including a mono filter, and an infrared filter. The rear facing camera 131 can include a single camera including one lens, or cameras including three or more lenses.

Figure 2:
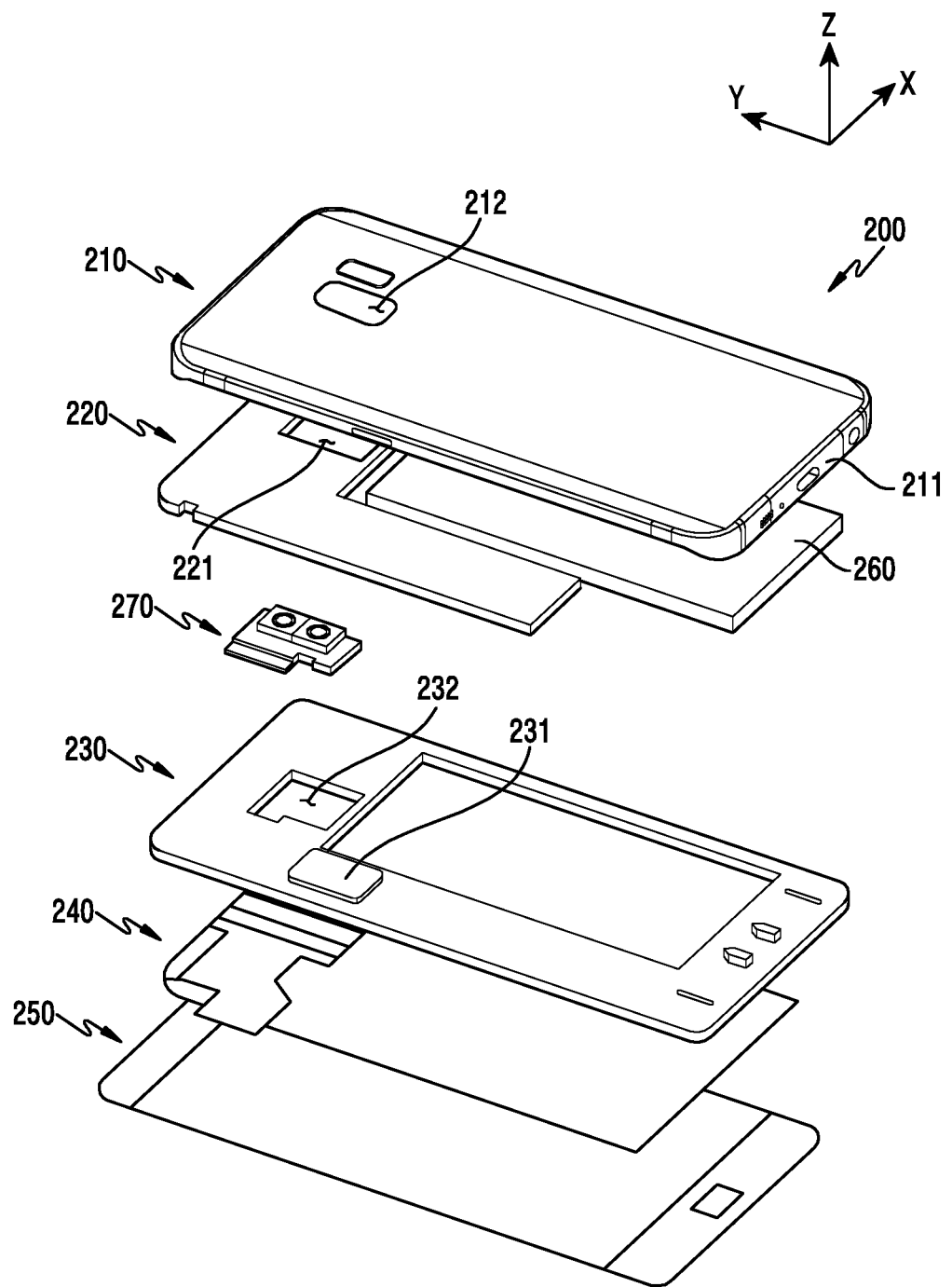
FIG. 2 is an exploded view of an electronic device including a camera module according to various embodiments of the present disclosure.

FIG. 2 is an exploded view of an electronic device including camera module according to various embodiments of the present disclosure. Referring to FIG. 2, an electronic device 200 according to various embodiments of the present disclosure can include a housing 210, a printed circuit board 220, a support member 230 (or bracket), a display 240, a window 250, a battery 260, and a camera module (e.g., including various image capturing circuitry and components) 270.

According to an embodiment of the present disclosure, the housing 210 and the window 250 can form an exterior of the electronic device 200. For example, the housing 210 can include a rear facing a +z direction, and the window 250 can include a front facing a −z direction. The housing 210 can include a side surface 211 surrounding at least part of a space between the rear of the housing 210 and the front of the window 250. The housing 210 which forms the rear of the electronic device 200, the window 250 which forms the front, and the side surface 211 which forms the side can be fixedly coupled at edges to thus mount internal components. While the side surface 211 can be integrally formed with the housing 210, the side surface 211 can be separated from the housing 210 or included in the support member 230 in other embodiments. For example, the support member 230 can include the side surface 211 and be exposed to outside, wherein the electronic device 200 can be referred to as a support member and housing integral type. For example, the housing 210 can include the side surface 211 and the support member 230 can be mounted in the housing 210 not to be exposed, wherein the electronic device 200 can be referred to as a support member and housing separate type.

According to various embodiments of the present disclosure, the printed circuit board 220, the support member 230, the display 240, the battery 260, and the camera 270 can be interposed between the housing 210 and the window 250.

According to an embodiment of the present disclosure, the support member 230 can provide structural rigidity of the electronic device 200 or a space for mounting the various components of the electronic device 200. For example, the display 240 can be interposed between the support member 230 and the window 250 so that a user can see contents displayed on the display 240 through the window 250. Also, the printed circuit board 220 can be interposed between the support member 230 and the housing 210 and secured by the support member 230 in the electronic device 200. The printed circuit board 220 can mount various components for various functions of the electronic device 200. The battery 260 can supply energy to the various components of the electronic device 200, and be supported and secured by the support member 230 in the electronic device 200. According to an embodiment, the printed circuit board 220 and the battery 260 can be disposed at the same layer on the support member 230. For example, the printed circuit board 220 and the batter 260 can have adequate shape and height and can be disposed on the same window within an area provided in the housing 210 of the electronic device 200.

Furthermore, the support member 230 can include a metallic material and used as a heat dissipation path from the various components of the electronic device 200. In other words, the support member 230 can be formed in a wide area of the electronic device 200 with the metallic material having high thermal conductivity, and thus can be used as a heat sink or a heart spreader, or the heat dissipation path of heat components as heat sources in the electronic device 200. For example, a heat component 231 (e.g., an AP or a Power Management Integrated Circuit (PMIC)) which produces the greatest heat in the electronic device 200 can be physically connected to a region of the support member 230 and spread its heat throughout the support member 230. For example, while the heat component 231 is securely coupled to the printed circuit board 220 with a top side, the heat component 231 can be thermally connected to the support member 230 with a bottom side using a Thermal Interface Material (TIM) and thus spread its heat. For example, the heat component 231 can effectively spread the heat to the support member 230 through a heat dissipating device such as a heat pipe (not shown).

According to an embodiment of the present disclosure, the camera module 270 can be exposed on the rear surface of the electronic device 200. For example, the camera module 270 can be disposed on an upper rear surface of the electronic device 200. Hence, the camera module 270 can be referred to as a rear facing camera. The camera module 270 can generate image data in a manner that an image sensor converts light of a subject received through at least one lens, to a digital signal. The camera module 270 can adjust a focus on the subject by moving the at least one lens along an optical axis (z axis) or controlling a thickness of the lens. For doing so, the camera module 270 can have a specific height.

According to an embodiment of the present disclosure, the printed circuit board 220 and the support member 230 can include an opening in a region, to mount the camera module 270 having the specific height. For example, the printed circuit board 220 can include a first opening 221 corresponding to a camera hole 212 of the housing 210 in the z direction. The camera module 270 can be inserted to the first opening 221 and securely coupled with the printed circuit board 220. The support member 230 can also include a second opening 232 in a region corresponding to the camera hole 212 and the first opening 221 in the z direction. The camera module 270 can be inserted to the second opening 232. When the camera module 270 is inserted to and mounted in the second opening 232, a bottom surface of the camera module 270 can be mounted on the same surface as a bottom surface of the support member 230, or mounted under the bottom surface of the support member 230. Hence, the camera module 270 having the specific height may not considerably protrude from the rear of the electronic device 200 which is completely assembled, or may form the same surface. This structure can contribute to slim thickness of the electronic device.

According to an embodiment of the present disclosure, the camera module 270 can be a dual-camera module including two cameras. For example, the dual-camera module can include a tele camera including a tele lens, and a wide camera including a wide lens. As shown in FIG. 2, the two cameras can be disposed side by side in the y-axis direction. According to other embodiment, the two cameras can be disposed side by side in the x-axis direction or diagonally, and can be disposed apart from each other. The dual-camera module needs to always keep the two cameras in a standby mode. For example, for a smooth zooming function, the wide camera needs to stand by when the tele camera is active, or the tele camera needs to stand by when the wide camera is active. Accordingly, the dual-camera module can produce high heat as well. That is, the camera module 270 is subject to the heat dissipation problem as the heat component of the electronic device 200.

According to an embodiment of the present disclosure, as a heat spread path for spreading the heat, the camera module 270 can be thermally connected to the support member 230. Thus, the heat of the camera module 270 can be spread and dissipated to the support member 230. Notably, the electronic device 200 can include not only the camera module 270 but also the other heat component 231, and the heat from the other heat component 231 can be transferred to heat the camera module 270. To address this problem, when the camera module 270 is inserted, the area of the second opening 232 can be greater than the area of the camera module 270 and thus a specific gap or slit can be disposed between the camera module 270 and the support member 230. To spread the heat of the camera module 270, at least a portion can be physically connected to the support member 230 for the sake of thermal conductivity. In other words, the camera module 270 does not physically contact the support member 230 thoroughly but is connected only in at least a portion, thus contributing to the effective heat dissipation of the camera module 270. The heat dissipation structure of the camera module 270, for example, the gap between the camera module 270 and the support member 230 shall be described in detail by referring to FIG. 3 and FIG. 4.

Figure 3:
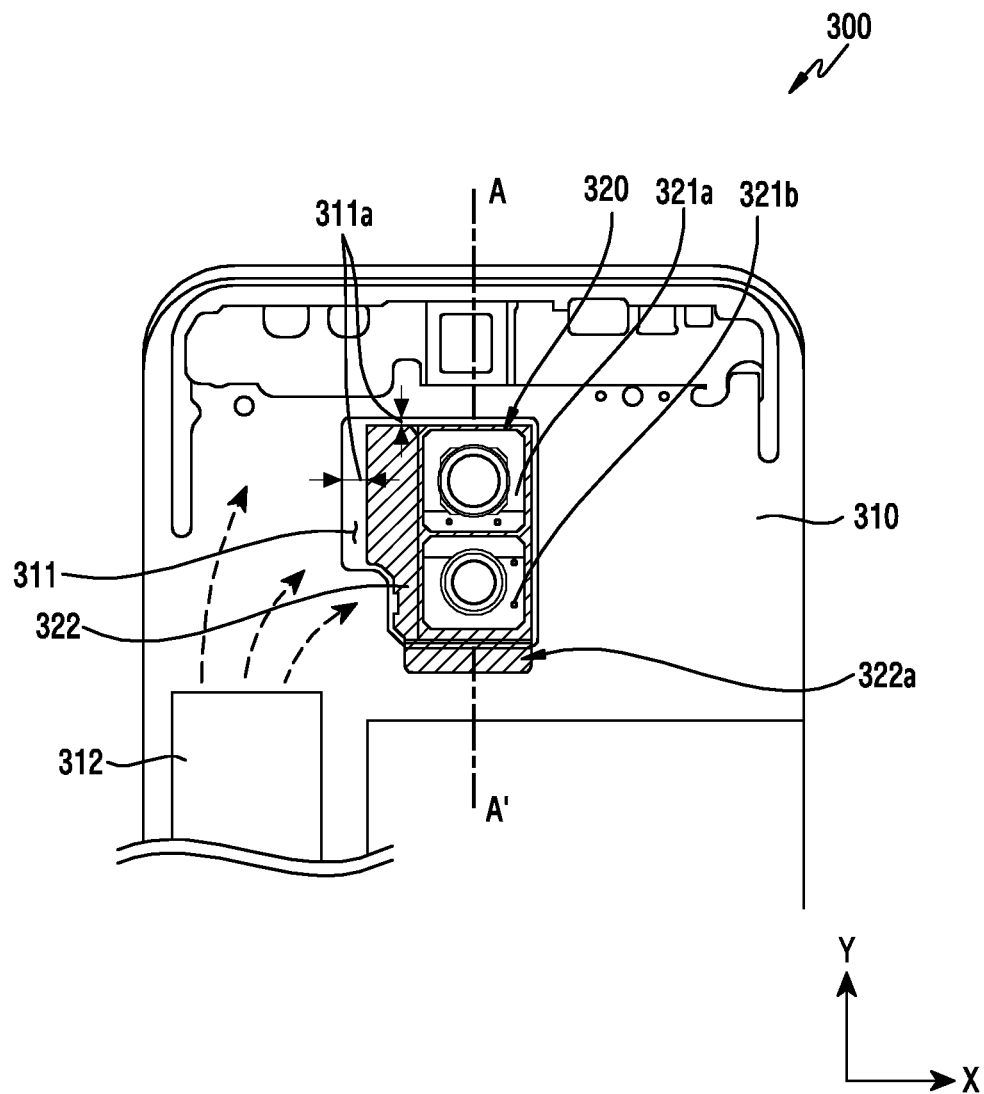
FIG. 3 is a cross-sectional view of an internal state where a camera module is mounted on a support member, in an electronic device according to various embodiments of the present disclosure.

FIG. 3 is a cross-sectional view of an internal state where a camera module is mounted on a support member, in an electronic device according to various embodiments of the present disclosure. The heat dissipation structure of the camera module 270 is now explained by referring to FIG. 3.

Referring to FIG. 3, an electronic device 300 according to various embodiments of the present disclosure can include a support member 310, and a camera module 320 mounted on the support member 310. The support member 310 can be formed with a wide area and a metallic material having high rigidity, so as to provide structural rigidity of the electronic device 300. Due to the metallic material of the wide area, the support member 310 can be used as a heat spread path of heat components of the electronic device 300. For example, a heat component 312 (e.g., an AP, a PMIC) can contact the support member 310 to transfer the heat, and the heat from the heat component 312 can be transferred to the support member 310 and spread along arrows.

According to an embodiment of the present disclosure, the camera module 320 can be, for example, a dual-camera module including a first camera 321*a* and a second camera 321*b*. The first camera 321*a* and the second camera 321*b* can include a combination of a tele camera or a wide camera. A conventional camera module is attached to a mounting groove of a support member with a bottom side (e.g., a base portion of a Steel Use Stainless (SUS) material) using an adhesive. In this case, it is difficult to effectively transfer the heat of the camera module to the support member, and high heat is transferred from other heat component to degrade camera performance.

Unlike the mounting structure of the conventional camera module, the camera module 320 according to various embodiments of the present disclosure can be inserted to and mounted in an opening 311 of the support member 310. The opening 311 can have a greater area than the camera module 320. Hence, with the camera module 230 inserted into the opening 311, the camera module 320 and the opening 311 can be disposed based on a gap or slit 311*a* at edges of the camera module 320. Thus, the gap or slit 311*a* between the camera module 320 and the support member 310 can prevent and/or reduce the heat of the support member 310 from spreading to the camera module 320. In other words, the heat from the heat component 312 can spread throughout the support member 310 along paths denoted by arrows, and the camera module 320 can be disposed on a path of the heat spreading through the support member 310. In so doing, in the conventional mounting structure which securely bonds the camera module to the wide region of the support member, the heat spreading through the support member can be transferred back to the camera module. On the other hand, the camera module 320 according to various embodiments of the present disclosure can prevent and/or reduce the spreading heat from transferring directly to the camera module 320 through the support member 310 thanks to the gap or slit 311*a* between the camera module 320 and the support member 310. Alternatively, the gap or slit 311*a* between the camera module 320 and the support member 310 can serve as a guide which transfers the heat spreading from other heat component through the support member 310, to other region of the support member 310, not to the camera module 320.

According to an embodiment of the present disclosure, the camera module 320 can include a camera support body 322 which surrounds the cameras 321*a* and 321*b*. The camera support body 322 can provide structure rigidity of the camera module 320. The camera support body 322 can include a material having high strength, high hardness, and low thermal conductivity, for example, a plastic (polymer) material. The plastic material generally has low thermal conductivity, and the camera support body 322 can prevent and/or reduce thermal exchange with the camera module 320 and nearby components. Namely, the camera support body 322, together with the gap or slit 311*a*, can prevent and/or reduce the heat spread from the support member 310 and thus improve heat dissipation of the camera module 320 and prevent and/or reduce the camera performance degradation caused by the heat. It is noted that the present disclosure is not limited to this embodiment, and the camera support body 322 can include various materials alone or in combination.

According to an embodiment of the present disclosure, for the heat dissipation, the camera module 320 can be physically connected to the support member 310 in at least a region of a periphery of the camera module 320. For example, a contact portion 322*a* projecting from a side of the camera module 320 can contact the support member 310. The heat of the camera module 320 can be spread to the support member 310 through the physical connection of the contact portion 322*a* to the support member 310. That is, the camera module 320 according to various embodiments of the present disclosure can block the heat spreading from the support member 310 by means of the gap or slit 311*a* arranged along the periphery, and spread the heat from the camera module 320 to the support member 310 through the contact portion 322*a* in at least a partial region of the periphery. The contact portion 322*a* can be disposed in a different direction from the direction of the heat component 312 based on the opening 311 and connected to the support member 310. For example, the heat component 312 can be disposed substantially on the left of the opening 311. In this case, the contact portion 322*a* can be disposed below the opening 311, not on the left, and connected to the support member 310. Accordingly, the camera module 320 is disposed to include the gap or slit 311*a* from the opening 311 of the support member 310 in most of the periphery, and the mounting structure which includes the contact portion 322*a* physically connected to the support member 310 in at least a portion or partial region of the periphery can improve the heat dissipation.

Figure 4A:
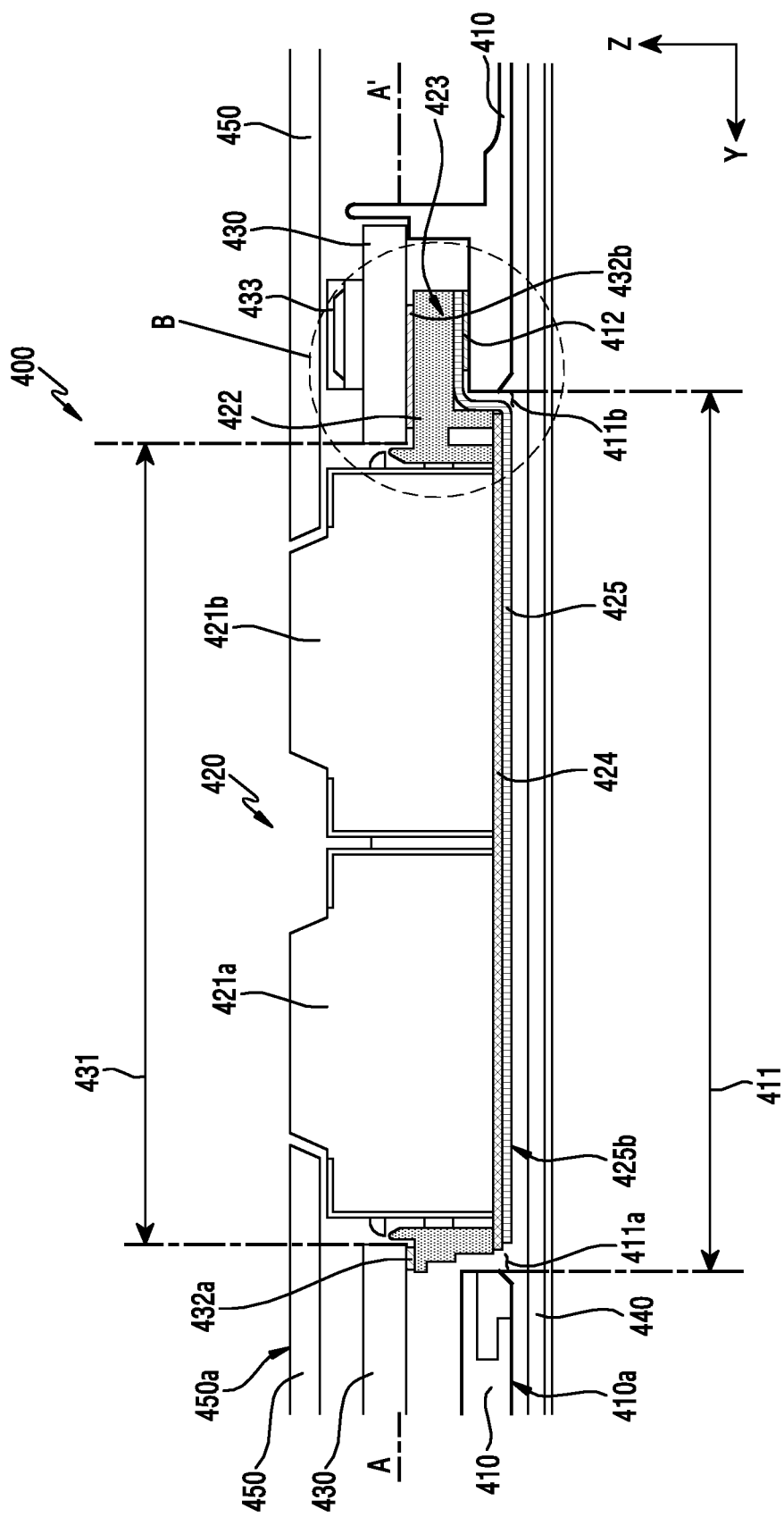
FIG. 4A is a cross-sectional view, taken along A-A', of an electronic device of FIG. 3 according to various embodiments of the present disclosure.
Figure 4B:
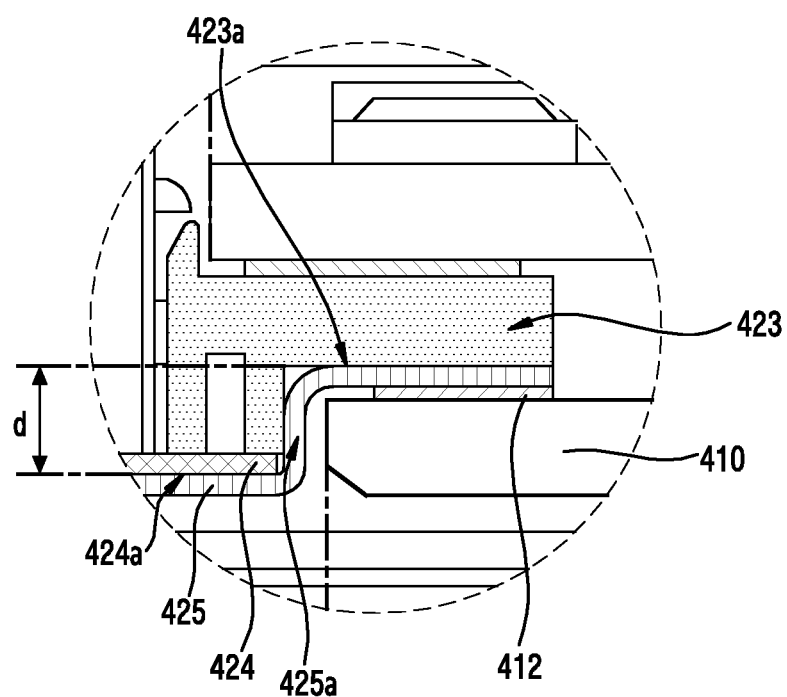
FIG. 4B is a partially enlarged view of area B in an electronic device of FIG. 4A according to various embodiments of the present disclosure.

FIG. 4A is a cross-sectional view, taken along A-A', of an electronic device of FIG. 3 according to various embodiments of the present disclosure. FIG. 4B is a partially enlarged view of B in an electronic device according to various embodiments of the present disclosure. A heat dissipation structure of a camera module, more specifically, arrangement of the camera module, a support member, and a printed circuit board is described by referring to FIG. 4A and FIG. 4B. An electronic device 400 of FIG. 4 can be similar or the same device as the electronic device of FIG. 3.

Referring to FIG. 4A, the electronic device 400 according to various embodiments of the present disclosure can include a support member 410 (e.g., the support member 310 of FIG. 3), a camera module 420 (e.g., the camera module 320 of FIG. 3), a printed circuit board 430, a display 440, and a housing 450. The camera module 420 can be inserted into a first opening 431 of the printed circuit board 430 and a second opening 411 (e.g., the second opening 311 of FIG. 3) of the support member 410 (e.g., the support member 310 of FIG. 3). The display 440 can be disposed in a downward direction (−z) of the support member 410 and the camera module 420, and the housing 450 can be disposed in an upward direction (+z).

According to various embodiments of the present disclosure, the camera module 420 can be dual cameras including a first camera 421a and a second camera 421b. The camera module 420 can include a base portion 424 disposed in the downward direction (−z). The base portion 424 can be formed with an SUS material, and provide structural rigidity and hardness of the camera module 420 and Electro-Magnetic Susceptibility (EMS) as a ground. The camera module 420 can be coupled with a support body 422 which is disposed to surround the periphery. The support body 422 can improve the structural rigidity of the camera module 420 and provide a physical fixing structure of the camera module 420. For example, the support body 422 can be securely bonded and coupled to the printed circuit board 430 which mounts various electrical components 433, using adhesives 432a and 432b. That is, the camera module 420 can be physically secured to the printed circuit board 430 through an adhesive area of the support body 422.

According to various embodiments of the present disclosure, the support member 410 can include an opening 411 where the camera module 420 is mounted. Since an area of the opening 411 is greater than a bottom cross-sectional area of the camera module 420, when the camera module 420 is inserted in the opening 411 of the support member 410, a periphery of the camera module 420 can include gaps or slits 411a and 411b between the support member 410 and the camera module 420. The gaps or slits 411a and 411b can prevent and/or reduce the heat spreading through the support member 410 from transferring directly to the camera module 420.

Referring to FIG. 4B, the camera module 420 according to various embodiments of the present disclosure can further include a flexible thermal conductor 425 disposed in a downward direction (−z) of the base portion 424. The flexible thermal conductor 425 can substantially overlap a front area of the base portion 424. The flexible thermal conductor 425 can extend to the base portion 424 and a lower portion 423a of a connecting portion 423 of the support body 422. A height of the support body 422 which surrounds the camera module 420 can be lower than the camera module 420. Hence, a lower portion 424a of the base portion 424 of the camera module 420 and a lower portion 423a of the connecting portion 423 can include a stepped portion having a height difference along the periphery of the base portion 424. The flexible thermal conductor 425 can include a bending portion 425a which curves at a stepped portion between the base portion 424 and the connecting portion 423 of the support body 422. With the bending portion 425a, the flexible thermal conductor 425 can compensate for the height difference d between the lower portion 424a of the base portion 424 of the camera module 420 and the lower portion 423a of the connecting portion 423. Alternatively, using the bending portion 425a, the flexible thermal conductor 425 can compensate for the height difference between the base portion 424 of the camera module 420 and the support member 410.

According to various embodiments of the present disclosure, the flexible thermal conductor 425 can be physically connected to the support member 410 in the connecting portion 423 of the support body 422, for thermal conductivity. The flexible thermal conductor 425 can serve as a path which transfers the heat from the camera module 420 to the support member 410. For example, the heat from the camera module 420 can be transferred to the flexible thermal conductor 425 through the base portion 424, and the transferred heat can be spread to the support member 410 through the flexible thermal conductor 425. That is, the flexible thermal conductor 425 can contribute to heat dissipation improvement of the camera module 420. The flexible thermal conductor 425 can be formed with a metal having high thermal conductivity, for example, a material such as copper (Cu), aluminum (Al), gold (Au), or silver (Ag). The flexible thermal conductor 425 can be formed as a thin plate to achieve flexibility for the bending portion 425a. Hence, the flexible thermal conductor 425 can include a combination of one or more of a copper tape, an aluminum tape, and a silver tape.

According to various embodiments of the present disclosure, a TIM 412 can be interposed between the flexible thermal conductor 425 and the support member 410. The TIM 412 fills microscopic holes between the flexible thermal conductor 425 and the support member 410 without any air bubbles and thus effectively emits the heat to the support member 410. The TIM 412 can use a thermal adhesive, grease, gel, paste, liquid, or pad. That is, the TIM 412 can improve the thermal conductivity between the camera module 420 which is the heat component and the support member 410 which is the heat sink.

Furthermore, the camera module 420 is inserted into the opening of the support member 410, and thus the lowest side of the camera module 420, for example, a bottom 425b of the flexible thermal conductor 425 may not protrude with respect to a bottom 410a of the support member 410. For example, the bottom 425b of the flexible thermal conductor 425 can form the same surface with the bottom 410a of the support member 410. According to other embodiment of the present disclosure, the bottom 425a of the flexible thermal conductor 425 can further protrude in the downward direction (−z) than the bottom 410a of the support member 410, which is not depicted. Hence, since the camera module 420 is mounted by inserting into the openings 411 and 431 of the support member 410 and the printed circuit board 430, rather than mounting on the printed circuit board 430 or the support member 410, the camera module 420 having the specific height may not considerably protrude in the upward direction (+z) more than a rear side 450a of the housing 450 of the electronic device 400. That is, since the camera does not protrude more than the rear side 450a of the electronic device 400, it can contribute to an external aesthetic feature of the electronic device 400 and slim thickness of the electronic device 400.

Figure 5:
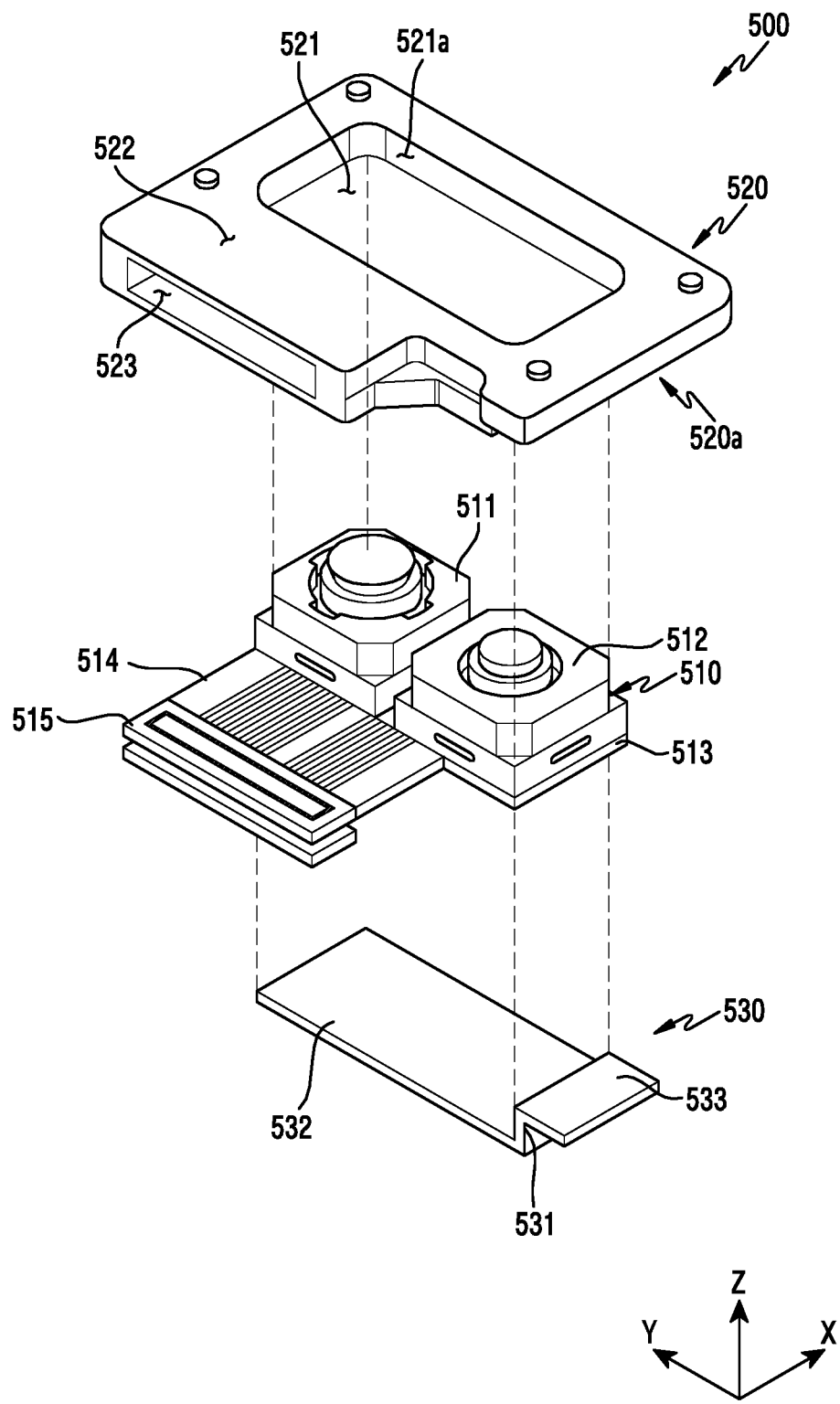
FIG. 5 is an exploded view of a camera module according to various embodiments of the present disclosure.

FIG. 5 is an exploded view of a camera module according to various embodiments of the present disclosure. A camera module 500 of FIG. 5 can be similar or the same device as the camera module 420 of FIG. 4.

Referring to FIG. 5, the camera module 500 (e.g., the camera module 420 of FIG. 4) according to various embodiments of the present disclosure can include a camera unit 510 (e.g., the camera module 420 of FIG. 4), a camera support body 520 (e.g., the connecting portion 423 of FIG. 4), and a flexible thermal conductor 530 (e.g., the flexible thermal conductor 425 of FIG. 4).

The camera unit 510 according to an embodiment can include dual cameras including a first camera 511 and a second camera 512, and a base portion 513 disposed in the downward direction (−z) of the first and second cameras 511 and 512. According to an embodiment, the camera unit 510 can include a single camera or a plurality of cameras (e.g., dual cameras or more cameras), and the present disclosure is not limited in the number of the cameras (or the number of lenses). The camera module 500 can include a flexible printed circuit board 514 and a connector 515 which protrude to a side. The flexible printed circuit board 514, which is bendable, can electrically connect the connector 515 to a printed circuit board (e.g., the printed circuit board 220 of FIG. 2), and thus the camera module 500 can be electrically connected with various electronic components of the electronic device.

The camera unit 510 according to an embodiment can be assembled with the support body 520. The first and second cameras 511 and 512 can be inserted into a first opening 521 of the camera unit 510. For example, the camera unit 510 can be securely coupled with the support body 520 in a manner that an inner surface 521a of the first opening 521 is securely bonded or securely bound to a tube or a body of the camera unit 510. The camera support body 520 can include a second opening 523 facing a side (or the −x direction) in a region corresponding to a region of the connector 515 of the camera unit 510. The flexible printed circuit board 514 and the connector 515 of the camera unit 510 can be assembled by passing through the second opening 523. Hence, the camera support body 520 can contribute to structural rigidity of the camera unit 510. In particular, in spite of the flexible printed circuit board 514 and the connector 515 which protrude in one direction of the camera unit 510, the camera support body 520 can surround the whole periphery of the first camera 511 and the second camera 512 and securely support the first and second cameras 511 and 512. On an upper surface 522 of the upward direction (+z), the camera support body 520 can be securely bonded to a printed circuit board (not shown) of the electronic device using an adhesive as explained in FIG. 4.

The flexible thermal conductor 530 according to an embodiment of the present disclosure can receive heat generating from the camera module 500, from the base portion 513 and spread the heat to a support member (not shown) which is coupled in a connecting portion 520a. The flexible thermal conductor 530 can be assembled with the camera unit 510 and an assembly of the camera support body 520. The flexible thermal conductor 530 can include a first surface 532 and a second surface 533 based on a bending portion 531. The first surface 532 can be coupled with the base portion 513 substantially throughout the surface, and the second surface 533 can be coupled with a lower portion of the connecting portion 520a of the camera support body 520. That is, the lower portion of the base portion 513 and the lower portion of the connecting portion 520a can include a height difference of a particular length, and the flexible thermal conductor 530 can compensate for the height difference by bending a stepped region of the lower portion of the base portion 513 and the lower portion of the connecting portion 520a. In other words, by means of the bending portion 531, the flexible thermal conductor 530 can compensate for the height difference between the base portion 513 of the camera unit 510 and the camera support body 520. For doing so, the flexible thermal conductor 530 can be formed with a flexible material having high thermal conductivity, for example, a material such as copper tape.

Figure 6:
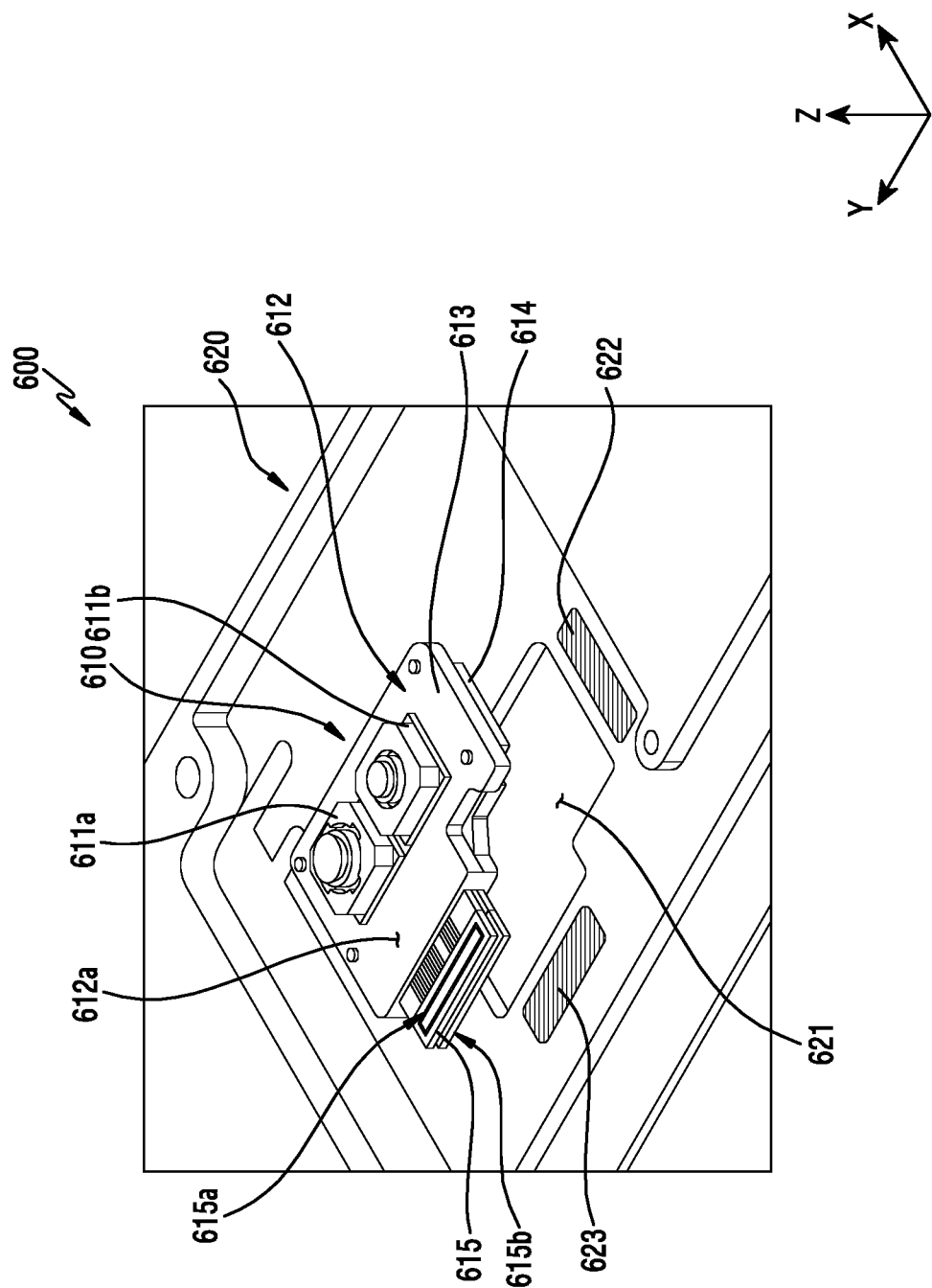
FIG. 6 is a diagram illustrating a camera module mounted on a support member according to various embodiments of the present disclosure.

FIG. 6 is a diagram illustrating a camera module mounted on a support member according to various embodiments of the present disclosure. An electronic device 600 of FIG. 6 can be similar or the same device as the electronic device 400 of FIG. 4.

Referring to FIG. 6, the electronic device 600 according to various embodiments of the present disclosure can include a camera module 610 (e.g., the camera module 420 of FIG. 4) and a support member 620 (e.g., the support member 410 of FIG. 4). The camera module 610 can be, for example, a dual-camera module including a first camera unit 611a and a second camera unit 611b. The support member 620 can provide structural rigidity of the electronic device 600 and a mounting structure of various internal components. In the electronic device 600 according to an embodiment, the camera module 610 can be mounted on the support member 620. For example, the support member 620 can include an opening 621, and the camera module 610 can be inserted into the opening 621. In so doing, an area of the opening 621 can be greater than an area of a lower portion of the camera module 610. Accordingly, when the camera module 610 is inserted to the opening 621, the camera module 610 can be spaced from the support member 620. Alternatively, the camera module 610 can be disposed to leave a gap with the opening 621 based on a support body 612 which surrounds the camera module 610.

The camera module 610 according to various embodiments of the present disclosure can include a base portion disposed under the first and second cameras 611a and 611b, and a flexible thermal conductor 614 disposed under the base portion. The camera module 610 can further include a camera support body 612 which surrounds a periphery of the first and second cameras 611a and 611b, and a region 613 of the camera support body 612 can extend, in a lower portion, from a lower portion of the base portion to mount the flexible thermal conductor 614. The flexible thermal conductor 614 disposed under the region 613 can be coupled with a TIM 622 disposed at a connecting position with the camera module 610 of the support member 620. For example, the TIM 622, which is an adhesive, can bond and couple the support member 620 with the flexible thermal conductor 614 of the region 613. Thus, the region 613 of the support body 612 and the flexible thermal conductor 614 of the lower portion can be referred to as a connecting portion or a heat transfer portion.

Notably, the physical coupling with the support member 620 in the region 613 (or the connecting portion) of the support body 612 may not be able to provide the structural rigidity which securely supports the camera module 610 in the electronic device 600. According to various embodiments, the camera module 610 can be securely attached to and supported by a printed circuit board (not shown) (e.g., the printed circuit board 220 of FIG. 2). For example, the printed circuit board can include an opening (e.g., the opening 221 of FIG. 2) which is suitable for the first and second camera units 611a and 611b, so that at least part of the first and second camera units 611a and 611b can pass through the opening and an upper surface 612a of the support body 612 of the camera module 610 can be securely coupled with a periphery of the opening of the printed circuit board. For example, the upper surface 612a of the support body 612 and a lower portion of the opening periphery can be securely bonded using an adhesive. Hence, the camera module according to various embodiments of the present disclosure is securely coupled to and supported by the printed circuit board, inserted into the opening with the gap from the opening of the support member along the periphery of the camera module, and mounted in the electronic device in a heat dissipation structure which dissipates the heat in the thermal contact with the support member in at least part of the periphery. Also, in a connector 615 of the camera module 610 according to various embodiments of the present disclosure, an upper surface 615a includes connecting ports and is electrically connected to the printed circuit board, and a lower surface 615b contacts a region 623 of the support member 620, which provides the structural rigidity such that the connector 615 and the camera module 610 are securely disposed in the electronic device 600.

Figure 7A:
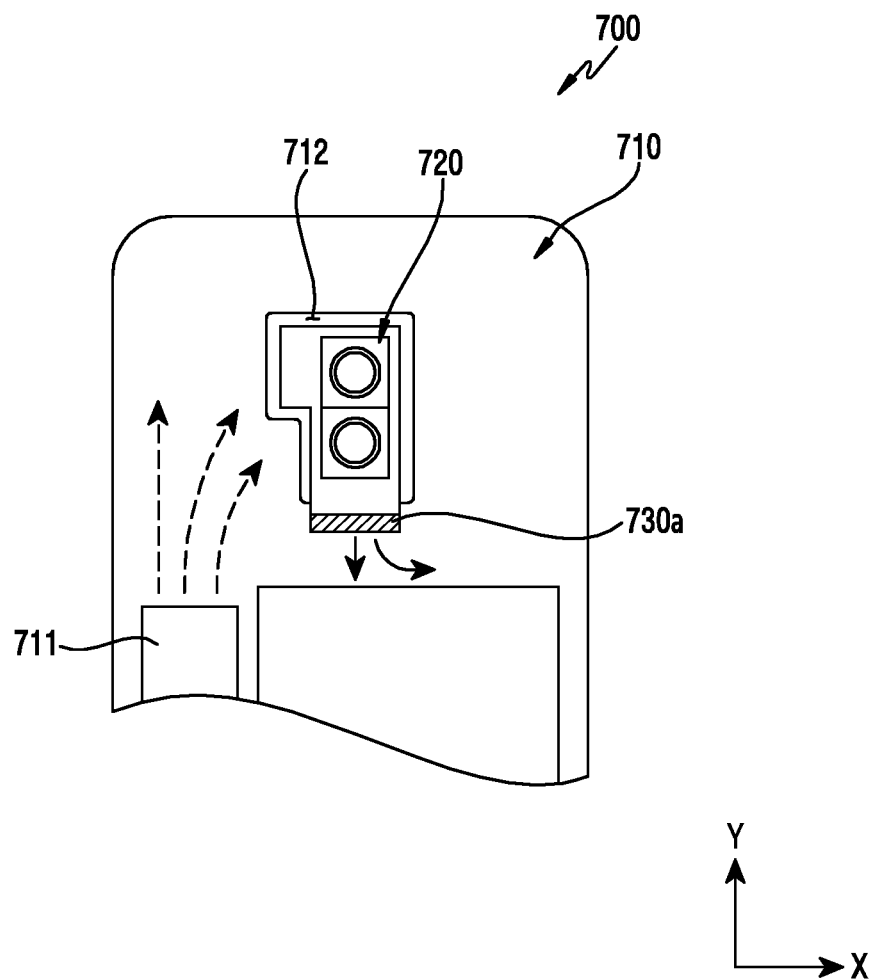
FIGS. 7A, 7B, and 7C are diagrams illustrating example embodiments including various configurations where a connecting portion of a camera module is coupled to a support member at various positions.
Figure 7B:
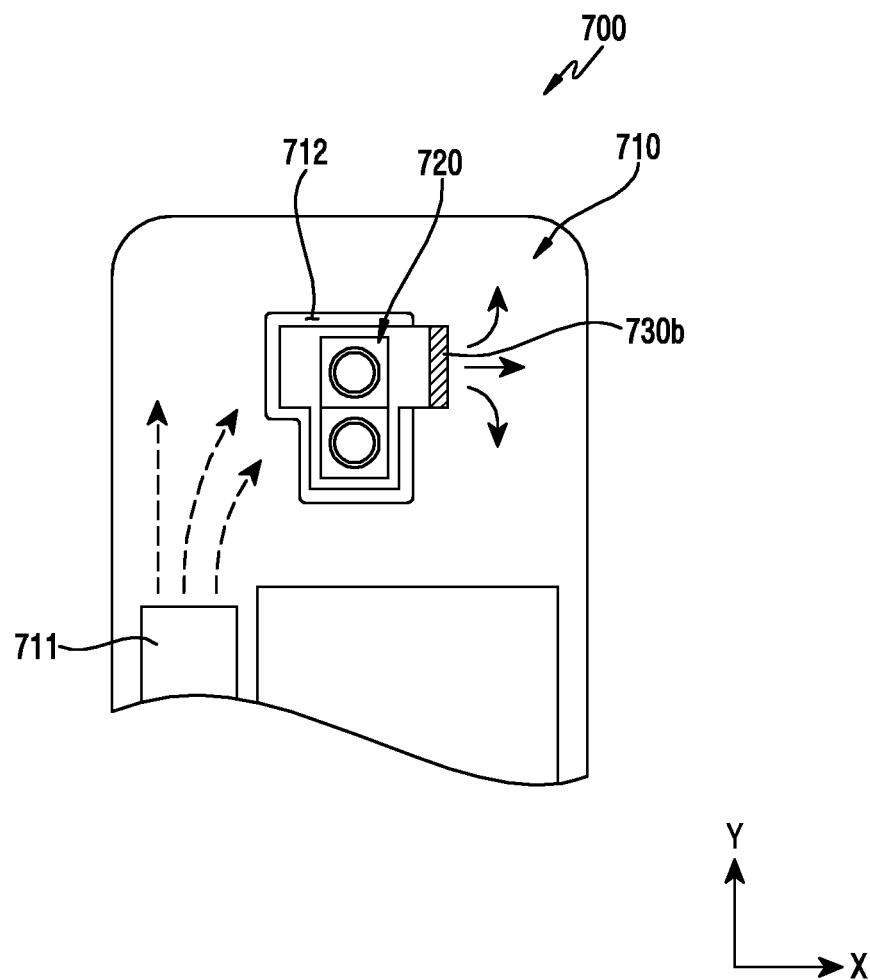
Figure 7C:
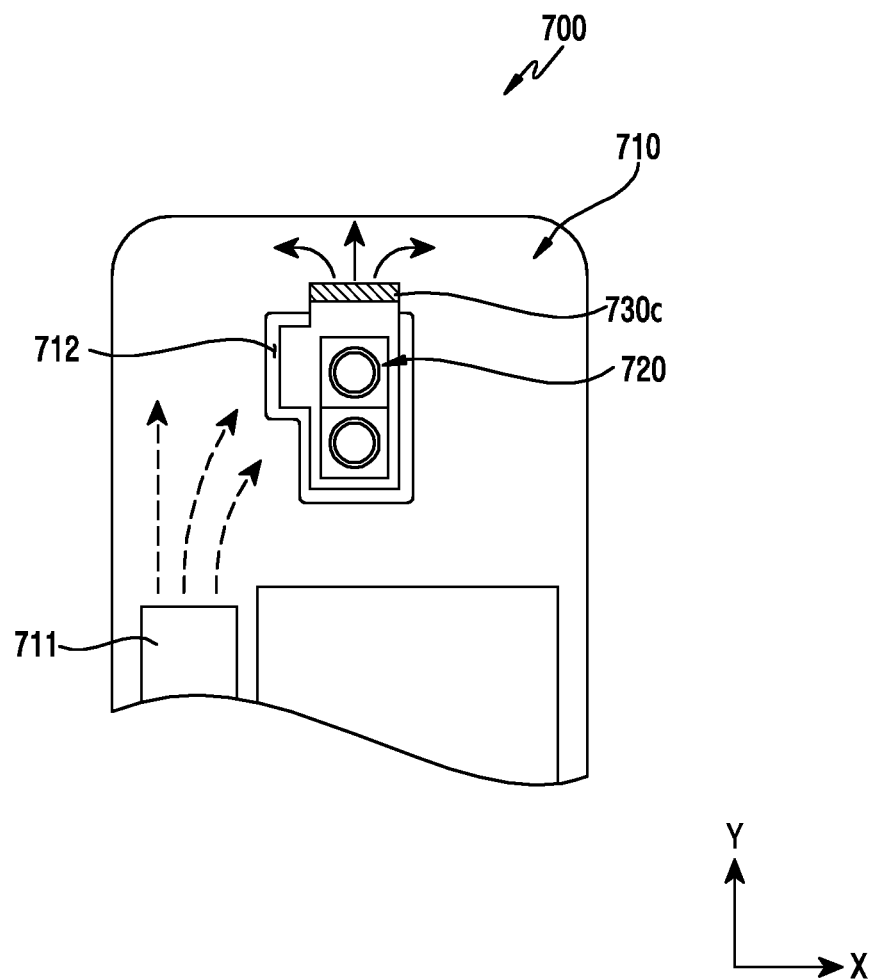

FIGS. 7A, 7B, and 7C are diagrams illustrating example embodiments including various configurations where a connecting portion of a camera module is coupled with a support member at various positions. In the embodiments of FIGS. 7A, 7B, and 7C, an electronic device 700 can include a support member 710, and a camera module 720 can be inserted into an opening of the support member 710 with a gap 712 along its periphery. The support member 710 can serve as a heat sink of heat produced by a heat component 711, and the heat transferred from the heat component 711 can be spread and dissipated from the support member 710 along arrows (dotted lines) The camera module 720 is disposed on the heat spread path from the heat component 711 to the support member 710, but is spaced from the support member 710 on account of the gap 712, thus blocking direct heat transfer. The camera module 720 can thermally contact the support member 710 in at least a region for the sake of its own heat dissipation, and configurations where the camera module 720 is connected to the support member through a connecting portion at various positions shall be described in the following embodiments.

Referring to FIG. 7A, a connecting portion 730a of the camera module 720 according to an embodiment of the present disclosure can be disposed in a different direction from a direction of the heat component 711 based on the camera module 720. For example, the heat component 711 is disposed approximately in a left direction (−x direction) based on the camera module 720. In this case, the connecting portion 730a can be disposed below the camera module 720. That is, the connecting portion 730a can be disposed in the −y direction from the camera module 720. Hence, the camera module 720 can efficiently spread its heat to the support member 710 through the connecting portion 730a.

Referring to FIG. 7B, a connecting portion 730b of the camera module 720 according to another embodiment of the present disclosure can be disposed in the right direction of the camera module 720. That is, the connecting portion 730b can be disposed in the +x direction from the camera module 720. Hence, the camera module 720 can efficiently spread its heat to the support member 710 through the connecting portion 730b, regardless of the heat spread path from the heat component 711 disposed in a relatively left-downward diagonal direction based on the camera module 720.

Referring to FIG. 7C, a connecting portion 730c of the camera module 720 according to yet another embodiment of the present disclosure can be disposed above the camera module 720. That is, the connecting portion 730c can be disposed in the +y direction from the camera module 720. Hence, the camera module 720 can efficiently spread its heat to the support member 710 through the connecting portion 730c, regardless of the heat spread path from the heat component 711.

It is noted that the present disclosure is not limited to those embodiments, and the connecting portions 730a, 730b, and 730c of FIGS. 7A, 7B, and 7C can be determined to adequate shapes and positions according to various matters such as various components (e.g., a battery, a USIM slot or a SD card slot, etc.) or a structure (e.g., a column between the support member and the printed circuit board) in the electronic device 700.

FIGS. 8A, 8B, 8C, 8D and 8E are diagrams illustrating example embodiments including various slit configurations disposed in response to various locations of a connecting portion of a camera module. In the embodiments of FIGS. 8A, 8B, 8C, 8D and 8E, an electronic device 800 can include a support member 810, and a camera module 820 can be inserted into an opening of the support member 810 with a gap 812 along its periphery. The support member 810 can serve as a heat sink of heat produced by a heat component 811, and the heat transferred from the heat component 811 can be spread and dissipated in the support member 810 along arrows (dotted lines) The camera module 820 is disposed on the heat spread path from the heat component 811 to the support member 810, but is spaced from the support member 810 on account of the gap 812, thus blocking direct heat transfer. The camera module 820 can thermally contact the support member 810 in at least a region for the sake of its own heat dissipation, and configurations where the camera module 820 is connected to the support member through a connecting portion at various positions and various configuration where slits of the support member are disposed based on the positions of the connecting portion shall be described in the following embodiments.

Figure 8A:
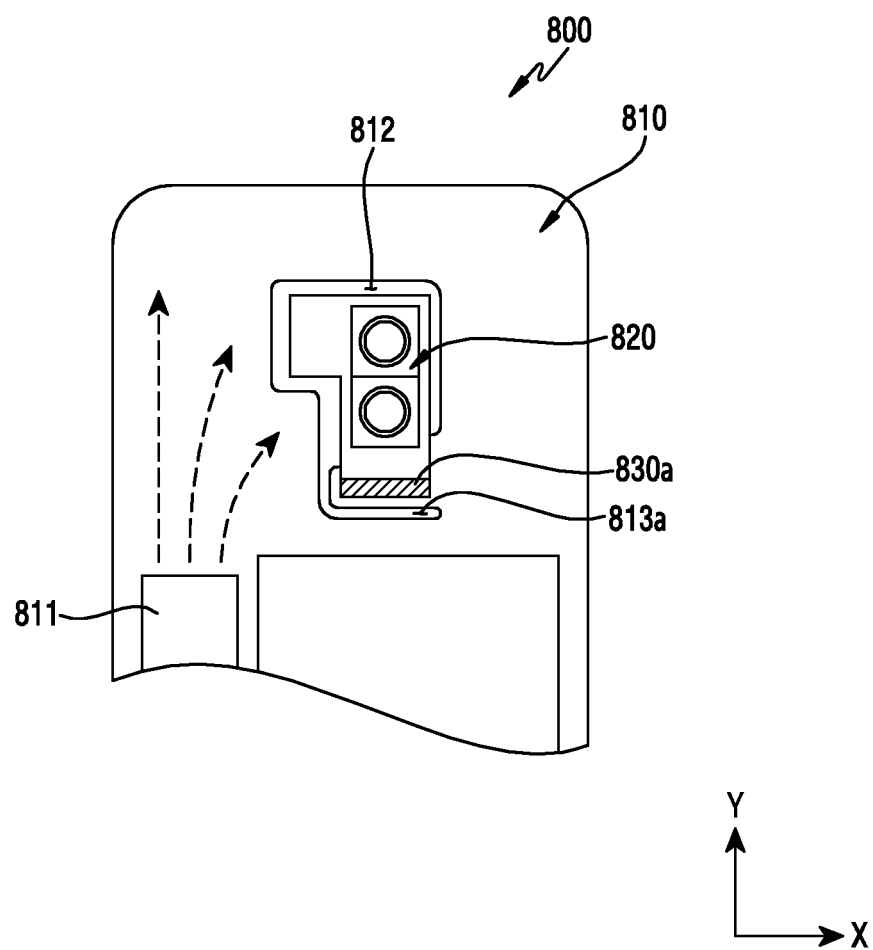
FIGS. 8A, 8B, 8C, 8D and 8E are diagrams illustrating example embodiments including various slit configurations disposed based on various positions of a connecting portion of a camera module.

Referring to FIG. 8A, a connecting portion 830a of the camera module 820 according to an embodiment of the present disclosure can be disposed below the camera module 820. That is, the connecting portion 830a can be disposed in the −y direction from the camera module 820. At this time, the support member 810 can include a slit 813a which extends from an opening including a gap 812. The slit 813a can be disposed substantially to surround the connecting portion 830a of the camera module 830. For example, the slit 813a can extend from the opening to surround a left side and/or a lower side of the connecting portion 830a. Hence, the slit 813a can serve as a heat spread guide such that heat produced from a heat component 811 disposed relatively in a left-download diagonal direction from the camera module 820 does not spread to the connecting portion 830a. That is, the gap 812 and the slit 813a of the support member 810 can contribute to heat dissipation enhancement of the camera module 820.

Figure 8B:
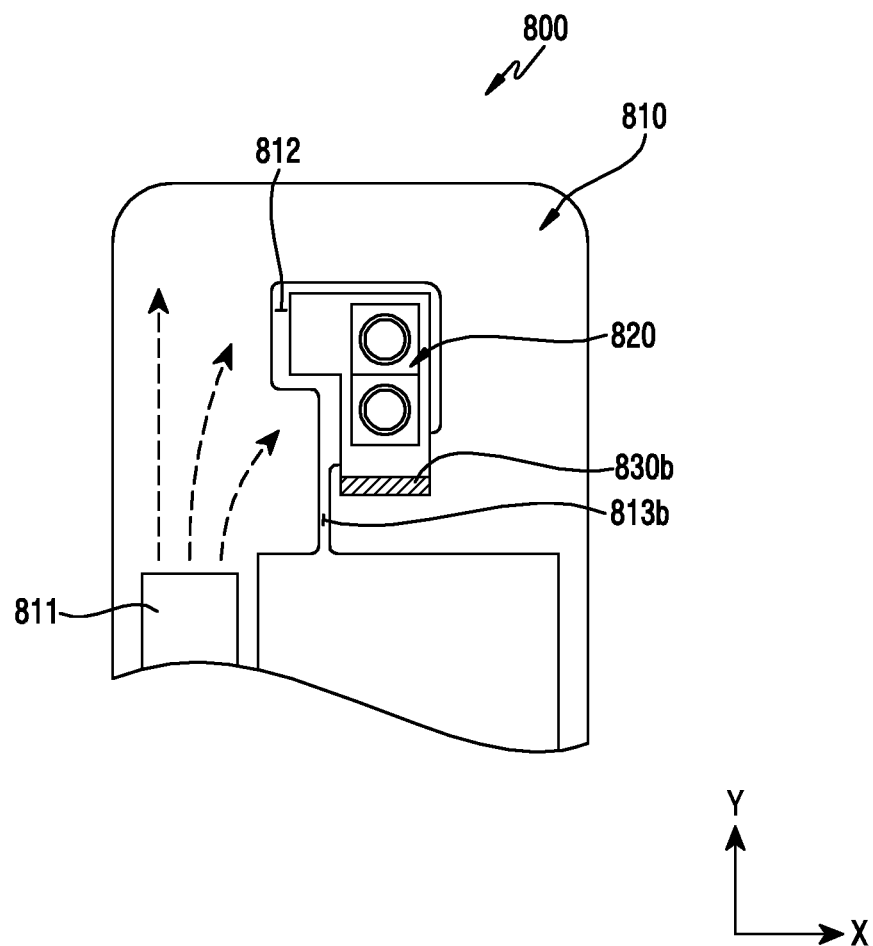

Referring to FIG. 8B, a connecting portion 830b of the camera module 820 according to another embodiment of the present disclosure can be disposed below the camera module 820. At this time, the support member 810 can include a slit 813b which extends from an opening including a gap 812. For example, the slit 813b can extend from the left of the connecting portion 830b of the camera module 830 to a terminal end of the support member 810. Hence, the support member 810 can be divided into a left region and a right region based on the slit 813b. The slit 813b can prevent and/or reduce heat generating from the heat component 811 disposed relatively on the left of the camera module 820, from spreading to the connecting portion 830b. In other words, the slit 813b can serve as a heat spread guide such that the heat generating from the heat component 811 spreads along arrows (dotted lines) on the support member 810 by avoiding the camera module 820. That is, the gap 812 and the slit 813b of the support member 810 can contribute to the heat dissipation enhancement of the camera module 820.

Figure 8C:
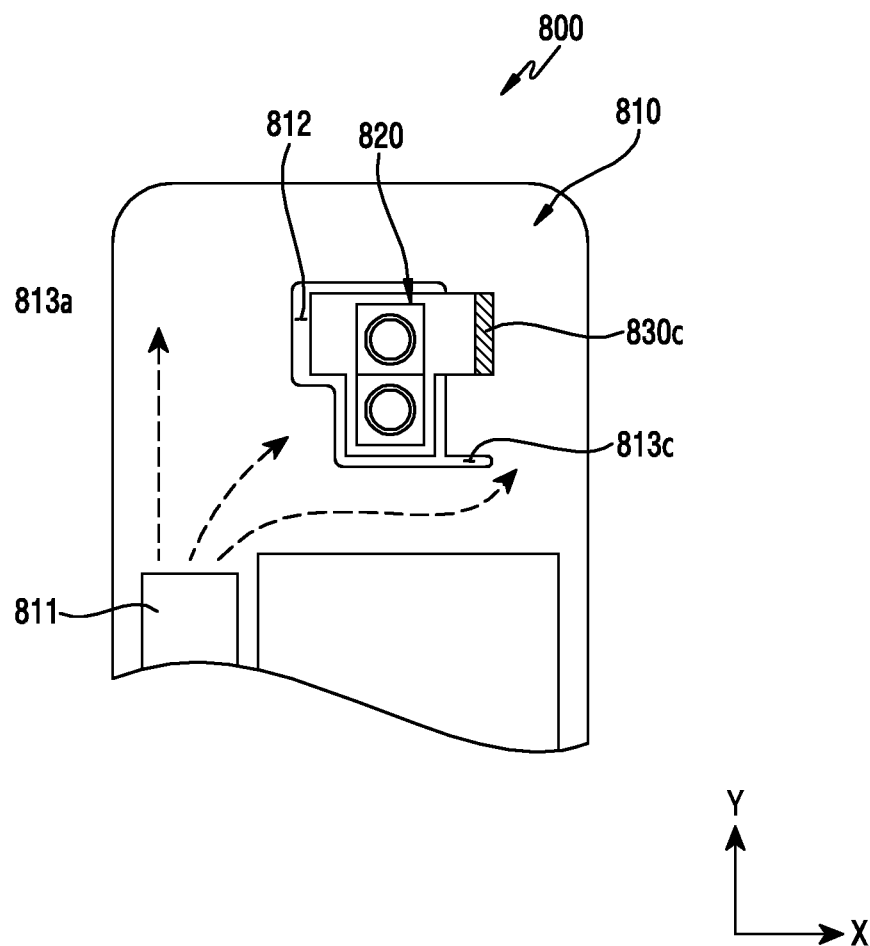

Referring to FIG. 8C, a connecting portion 830c of the camera module 820 according to yet another embodiment of the present disclosure can be disposed on the right of the camera module 820. That is, the connecting portion 830c can be disposed in the x direction from the camera module 820.

At this time, the support member 810 can include a slit 813c which extends from an opening including a gap 812. The slit 813c can be disposed substantially to surround the connecting portion 830a of the camera module 830. For example, the slit 813c can extend from the opening to surround a lower side of the connecting portion 830a. Hence, the slit 813c can serve as a heat spread guide by blocking heat generating from a heat component 811 from spreading to the connecting portion 830c. That is, the gap 812 and the slit 813c of the support member 810 can contribute to the heat dissipation enhancement of the camera module 820.

Figure 8D:
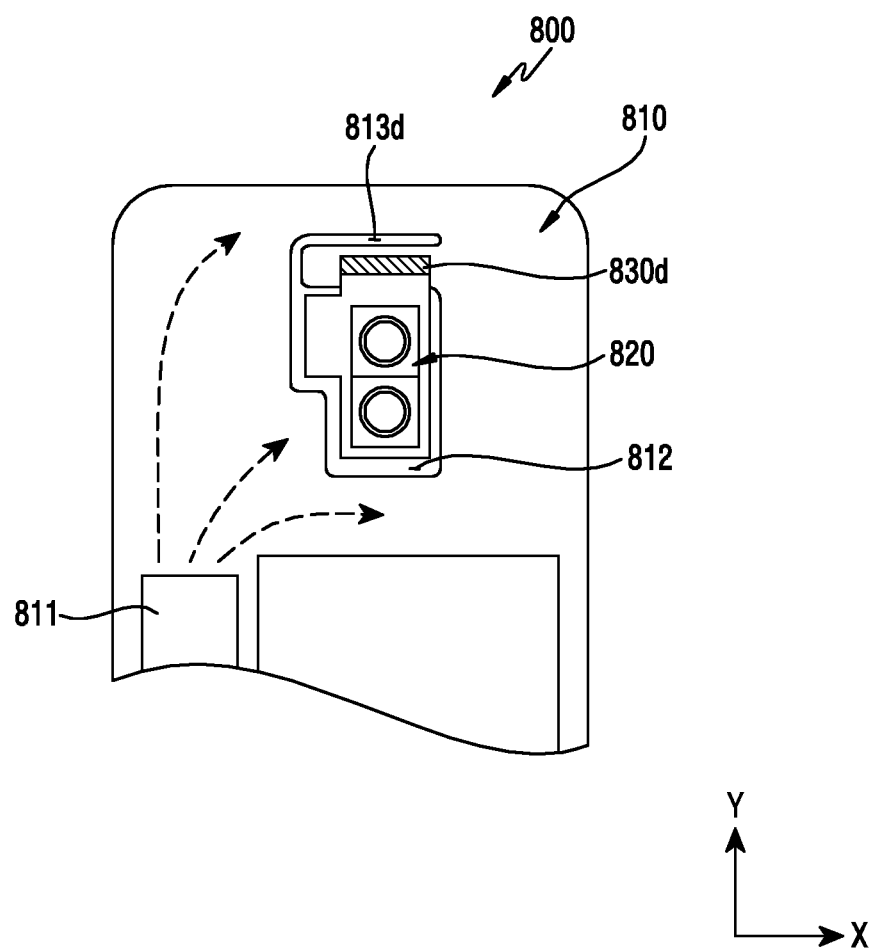

Referring to FIG. 8D, a connecting portion 830d of the camera module 820 according to still another embodiment of the present disclosure can be disposed above the camera module 820. That is, the connecting portion 830d can be disposed in the +y direction from the camera module 820. At this time, the support member 810 can include a slit 813d which extends from an opening including a gap 812. The slit 813d can be disposed substantially to surround the connecting portion 830d of the camera module 830. For example, the slit 813c can extend from the opening by surrounding a left side and/or an upper side of the connecting portion 830d. Hence, the slit 813c can serve as a heat spread guide by blocking heat generating from a heat component 811 disposed in a left-download diagonal direction relatively from the camera module 820, from spreading to the connecting portion 830d. That is, the gap 812 and the slit 813d of the support member 810 can contribute to the heat dissipation enhancement of the camera module 820.

Figure 8E:
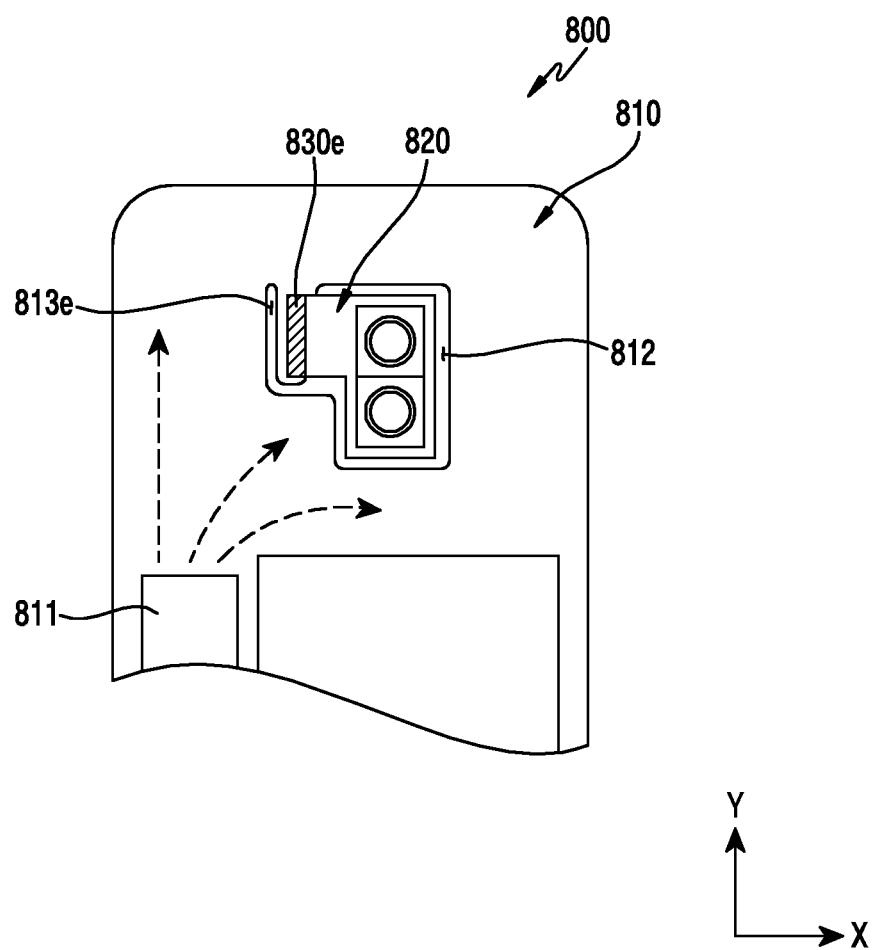

Referring to FIG. 8E, a connecting portion 830e of the camera module 820 according to a further embodiment of the present disclosure can be disposed on the left of the camera module 820. That is, the connecting portion 830e can be disposed in the −x direction from the camera module 820. At this time, the support member 810 can include a slit 813e which extends from an opening including a gap 812. The slit 813e can be disposed substantially to surround the connecting portion 830e of the camera module 830. For example, the slit 813e can extend from the opening by surrounding a left side and/or a lower side of the connecting portion 830e. Hence, the slit 813e can serve as a heat spread guide by blocking heat transferred from a heat component 811 from spreading to the connecting portion 830e which is relatively close to the heat component 811. That is, although the connecting portion 830e is disposed relatively close to the heat component 811 according to various matters, the slit 813e can contribute to the heat dissipation enhancement of the camera module 820.

It is noted that the present disclosure is not limited to those embodiments, and the slit 813b of FIGS. 8A, 8B, 8C, 8D and 8E can have adequate shape and length according to various matters such as an area of the support member 810, various components, and a structure.

An electronic device according to an embodiment of the present disclosure comprising: at least one heat component; a camera module comprising image capturing circuitry and components disposed within a specified distance of the at least one heat component; and a support comprising a first opening configured to receive the camera module therein and wherein when the camera module is disposed in the first opening, a gap is provided along at least a portion of a periphery of the camera module.

The electronic device according to an embodiment of the present disclosure comprising, wherein the first opening is disposed in at least a region of the support, and configured to block at least a portion of heat produced from the at least one heat component from being transferred to the camera module.

The electronic device according to an embodiment of the present disclosure, wherein the camera module further comprises: a connecting portion including a connector, wherein the connecting portion is physically connected to the support in at least a region of the periphery of the camera module.

The electronic device according to an embodiment of the present disclosure, wherein the camera module comprises: a camera unit comprising a camera; a base disposed under the camera unit; a camera support body surrounding the periphery of the camera module; and a flexible thermal conductor disposed under the base, wherein the connecting portion comprises at least a portion of the camera support body, and the flexible thermal conductor extends to a lower portion of the connecting portion.

The electronic device according to an embodiment of the present disclosure, further comprising: a Thermal Interface Material (TIM) interposed between the flexible thermal conductor and the support, under the connecting portion.

The electronic device according to an embodiment of the present disclosure, wherein a lower portion of the base and the lower portion of the connecting portion have a height difference, and the flexible thermal conductor is configured to compensate for the height difference by bending a stepped portion of the lower portion of the base portion and the lower portion of the connecting portion.

The electronic device according to an embodiment of the present disclosure, further comprising: a printed circuit board disposed on the support, wherein the printed circuit board is coupled to the camera module and supports the camera module.

The electronic device according to an embodiment of the present disclosure, wherein the printed circuit board further comprises: a second opening, wherein the camera module is inserted into the second opening, and the camera support body is coupled to at least a portion of a periphery of the second opening of the printed circuit board.

The electronic device according to an embodiment of the present disclosure, wherein the at least one heat component is mounted on and physically connected to the printed circuit board and is configured to transfer the heat to the support member.

The electronic device according to an embodiment of the present disclosure, wherein the connecting portion is physically connected to the support in a different direction from a direction of the heat component based on the first opening.

The electronic device according to an embodiment of the present disclosure, wherein the support comprises: at least one slit disposed along at least a portion of a periphery of the connecting portion.

The electronic device according to an embodiment of the present disclosure, wherein the slit is disposed to surround at least part of the periphery of the connecting portion.

The electronic device according to an embodiment of the present disclosure, wherein the at least one slit extends from the first opening.

The electronic device according to an embodiment of the present disclosure, wherein a lower portion of the camera module is inserted to the first opening, wherein the lower portion of the camera module and the lower portion of the support are in substantially a same plane or the lower portion of the camera module is disposed to be at least partially lower than a bottom of the support.

The electronic device according to an embodiment of the present disclosure, wherein the camera support body comprises a plastic polymer material.

The electronic device according to an embodiment of the present disclosure, wherein the flexible thermal conductor comprises a copper tape.

The electronic device according to an embodiment of the present disclosure comprising: a housing comprising a first surface facing a first direction; a window comprising a second surface facing a second direction opposite the first direction; a support interposed between the housing and the window; a display interposed between the support and the window; and a printed circuit board interposed between the housing and the support, wherein the first surface of the housing comprises a camera hole, the printed circuit board comprises a first opening in a region corresponding to the camera hole, and the support comprises a second opening in a region corresponding to the camera hole and the first opening, the electronic device further comprising: a camera module comprising a camera exposed to an outside of the electronic device through the camera hole of the first surface, is coupled to and supported by the first opening of the printed circuit board, is inserted in the second opening of the support, and is spaced from the second opening of the support member by a gap along at least a portion of a periphery of the camera module.

The electronic device according to an embodiment of the present disclosure, wherein the camera module comprises: a base disposed under the camera; a camera support surrounding at least a portion of a periphery of the camera; a flexible thermal conductor disposed under the base; and a connecting portion extending from the flexible thermal conductor to a lower portion of at least a region of the support, wherein the connecting portion is physically connected to the support in at least a portion of a region of the periphery of the camera module.

The electronic device according to an embodiment of the present disclosure, wherein a Thermal Interface Material (TIM) is interposed between the flexible thermal conductor and the support, under the connecting portion.

The electronic device according to an embodiment of the present disclosure, further comprising: a heat component mounted on the printed circuit board and thermally contacting the support, wherein the connecting portion is physically connected to the support member in a direction different from a direction of the heat component based on the second opening.

Various embodiments disclosed herein are provided merely to describe technical details of the present disclosure and to help the understanding of the present disclosure, and are not intended to limit the scope of the present disclosure. Accordingly, the scope of the present disclosure should be understood as including all modifications or various other embodiments based on the technical idea of the present disclosure.

As set forth above, the electronic device according to various embodiments of the present disclosure includes the heat dissipation structure of the camera module, and thus can effectively dissipate the heat of the camera module and prevent and/or reduce the performance degradation of the camera module.

Specifically, the electronic device according to various embodiments of the present disclosure includes the heat dissipation structure which blocks the heat producing from other heat component from transferring directly to the camera module through the support member and effectively spreads the heat of the camera module to the support member.

In the heat dissipation structure according to various embodiments of the present disclosure, the lower portion of the camera module can be mounted lower than the support member. Hence, the camera module does not considerably protrude more than the exterior of the electronic device, thus improving the aesthetic feature of the electronic device exterior and contributing to the slimness of the electronic device.

While the disclosure has been illustrated and described with reference to various example embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a support comprising a first opening;
   a camera module including at least one camera, wherein at least a portion of the camera module is disposed in the first opening with a gap between the at least portion of the camera module and the support;
   at least one heat generating component distinct from the camera module;
   a flexible thermal conductor disposed under the camera module, wherein at least a portion of the flexible thermal conductor is physically contacted to the support;
   wherein the camera module further includes a connecting portion, wherein the connecting portion is physically connected to the support in at least a region of a periphery of the camera module;
   wherein the camera module further comprises:
      a camera unit comprising the camera;
      a base disposed between the camera unit and the flexible thermal conductor;
      a camera support body surrounding a periphery of the camera unit,
   wherein the connecting portion further comprises at least a portion of the camera support body; and
   wherein the flexible thermal conductor extends to a lower portion of the connecting portion.

2. The electronic device of claim 1, further comprising: a Thermal Interface Material (TIM) interposed between the flexible thermal conductor and the support, under the connecting portion.

3. The electronic device of claim 1, wherein a lower portion of the base and the lower portion of the connecting portion have a height difference, and
   the flexible thermal conductor is configured to compensate for the height difference by bending a stepped portion of the lower portion of the base portion and the lower portion of the connecting portion.

4. The electronic device of claim 1, further comprising:
   a printed circuit board disposed on the support,
   wherein the printed circuit board is coupled to the camera module and supports the camera module.

5. The electronic device of claim 4, wherein the printed circuit board further comprises:
   a second opening,
   wherein the camera module is inserted into the second opening, and the camera support body is coupled to at least a portion of a periphery of the second opening of the printed circuit board.

6. The electronic device of claim 4, wherein the at least one heat generating component is mounted on and physically connected to the printed circuit board and is configured to transfer the heat to the support member.

7. The electronic device of claim 1, wherein the connecting portion is physically connected to the support in a different direction from a direction of the heat generating component based on the first opening.

8. The electronic device of claim 1, wherein the support comprises:
at least one slit disposed along at least a portion of a periphery of the connecting portion.

9. The electronic device of claim 8, wherein the slit is disposed to surround at least part of the periphery of the connecting portion.

10. The electronic device of claim 8, wherein the at least one slit extends from the first opening.

11. The electronic device of claim 1, wherein a lower portion of the camera module is inserted to the first opening, wherein the lower portion of the camera module and the lower portion of the support are in substantially a same plane or the lower portion of the camera module is disposed to be at least partially lower than a bottom of the support.

12. The electronic device of claim 1, wherein the camera support body comprises a plastic polymer material.

13. The electronic device of claim 1, wherein the flexible thermal conductor comprises a copper tape.

14. An electronic device comprising:
a housing comprising a first surface facing a first direction;
a window comprising a second surface facing a second direction opposite the first direction;
a support interposed between the housing and the window;
a display interposed between the support and the window; and
a printed circuit board interposed between the housing and the support,
wherein the first surface of the housing comprises a camera hole,
the printed circuit board comprises a first opening in a region corresponding to the camera hole, and
the support comprises a second opening in a region corresponding to the camera hole and the first opening,
the electronic device further comprising: a camera module comprising a camera exposed to an outside of the electronic device through the camera hole of the first surface, is coupled to and supported by the first opening of the printed circuit board, is inserted in the second opening of the support, and is spaced from the second opening of the support member by a gap along at least a portion of a periphery of the camera module.

15. The electronic device of claim 14, wherein the camera module comprises:
a base disposed under the camera;
a camera support surrounding at least a portion of a periphery of the camera;
a flexible thermal conductor disposed under the base; and
a connecting portion extending from the flexible thermal conductor to a lower portion of at least a region of the support,
wherein the connecting portion is physically connected to the support in at least a portion of a region of the periphery of the camera module.

16. The electronic device of claim 15, wherein a Thermal Interface Material (TIM) is interposed between the flexible thermal conductor and the support, under the connecting portion.

17. The electronic device of claim 16, further comprising:
a heat component mounted on the printed circuit board and thermally contacting the support,
wherein the connecting portion is physically connected to the support member in a direction different from a direction of the heat component based on the second opening.

* * * * *